(12) United States Patent
Smith

(10) Patent No.: US 7,351,181 B2
(45) Date of Patent: Apr. 1, 2008

(54) CONTINUOUSLY VARIABLE TRANSMISSION

(76) Inventor: Robert Smith, 166 CCC Rd., Wartburg, TN (US) 37887

( * ) Notice: Subject to any disclaimer, the term of this patent is extended or adjusted under 35 U.S.C. 154(b) by 824 days.

(21) Appl. No.: 10/878,500

(22) Filed: Jun. 28, 2004

(65) Prior Publication Data

US 2005/0288138 A1 Dec. 29, 2005

(51) Int. Cl.
*F16H 15/16* (2006.01)
(52) U.S. Cl. .......................................... 476/47; 476/50
(58) Field of Classification Search ................... 476/47, 476/50, 51, 52
See application file for complete search history.

(56) References Cited

U.S. PATENT DOCUMENTS

| | | | |
|---|---|---|---|
| 2,583,790 A | 1/1952 | Mikina | |
| 3,298,238 A | 1/1967 | Lea | |
| 3,765,257 A | 10/1973 | Ogino | |
| 3,848,475 A | 11/1974 | Tippmann | |
| 4,183,253 A | 1/1980 | Borello | |
| 4,630,495 A | 12/1986 | Smith | |
| 5,014,565 A | 5/1991 | Stephenson | |
| 5,545,100 A | 8/1996 | Roovers et al. | |
| 5,545,101 A | 8/1996 | Kawase et al. | |
| 5,601,509 A | 2/1997 | Munoz | |
| 5,746,676 A | 5/1998 | Kawase et al. | |
| 6,139,465 A | 10/2000 | Holliday | |
| 6,338,692 B1 | 1/2002 | Magyari | |
| 6,558,286 B1 | 5/2003 | Gulia | |
| 2001/0024993 A1 | 9/2001 | Tsukada et al. | |

*Primary Examiner*—William C Joyce
(74) *Attorney, Agent, or Firm*—Pitts & Brittian, P.C.

(57) ABSTRACT

A continuously variable transmission includes at least one transmitter having two graduated surfaces mounted to provide frictional engagement with a driving cylinder and a driven cylinder. A shifter having two graduated surfaces is axially mounted within the housing. The transmitter is not mounted on a shaft, but is urged into engagement with the driving cylinder and the driven cylinder by two elongated followers. Each follower includes a first end and an opposing second end. Axial movement of the shifter provides simultaneous and opposing movement of the first and second followers to impart pivotal movement of the axis of rotation of the transmitter.

18 Claims, 3 Drawing Sheets

CONTINUOUSLY VARIABLE TRANSMISSION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to continuously variable transmissions.

More particularly, this invention pertains to a continuously variable transmission including at least one double-coned transmitter in frictional engagement with a driving cylinder and a driven cylinder.

2. Description of the Related Art

Many efforts have been made to develop continuously variable transmissions. Conical and spherical surfaces have been used to transmit energy from a drive cylinder to a driven cylinder at different rates of rotation based upon the varying diameter of the cone or sphere. Generally, the cone or sphere is rotatably mounted upon a shaft which is movable either axially or pivotally to adjust the specific area of frictional engagement of the cone or sphere with another rotating surface mechanically connected to a drive shaft or a driven shaft.

BRIEF SUMMARY OF THE INVENTION

According to one embodiment of the present invention, at least one transmitter including two graduated surfaces is mounted to provide frictional engagement with a driving cylinder and a driven cylinder. The transmitter is not mounted on a shaft, but is urged into engagement with the driving cylinder and the driven cylinder by two elongated followers. Each follower includes a first end and an opposing second end. Upon the first end of each follower a wheel is rotatably mounted for rotational engagement with one of the two graduated surfaces of the transmitter. The second end of each follower engages with a graduated surface of a shifter. The shifter includes two coaxial opposing graduated surfaces. The shifter is axially movable to provide simultaneous and opposing movement of the two followers for each transmitter. Accordingly, as the shifter is moved axially, the wheels of the followers cause the axis of rotation of the transmitter to pivot and change the location of engagement of the two wheels with the two graduated surfaces.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
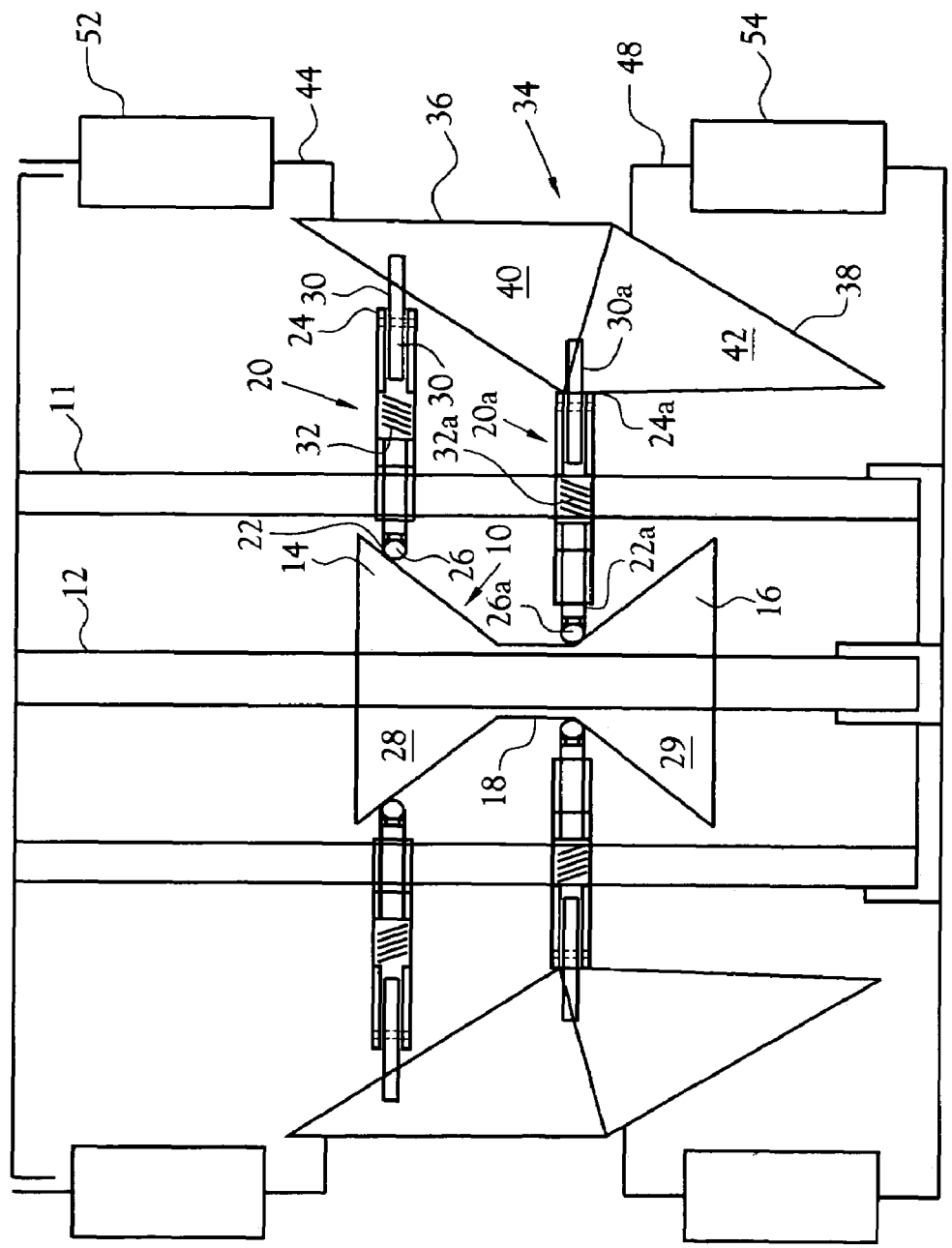
FIG. 1 is a schematic cross-sectional view of one embodiment of the present invention.
Figure 2:
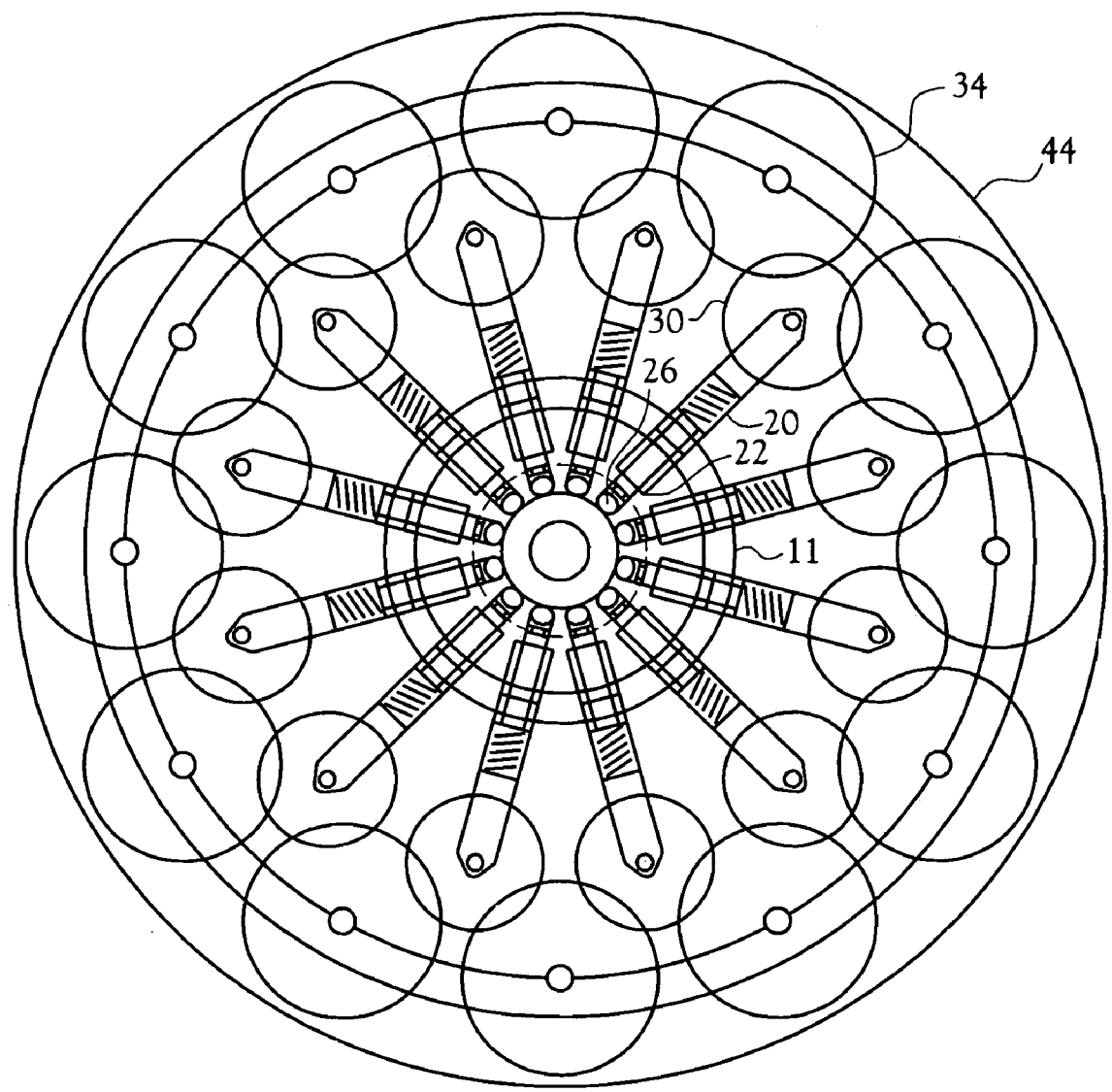
FIG. 2 is schematic elevation view of one embodiment of the present invention.
Figure 3:
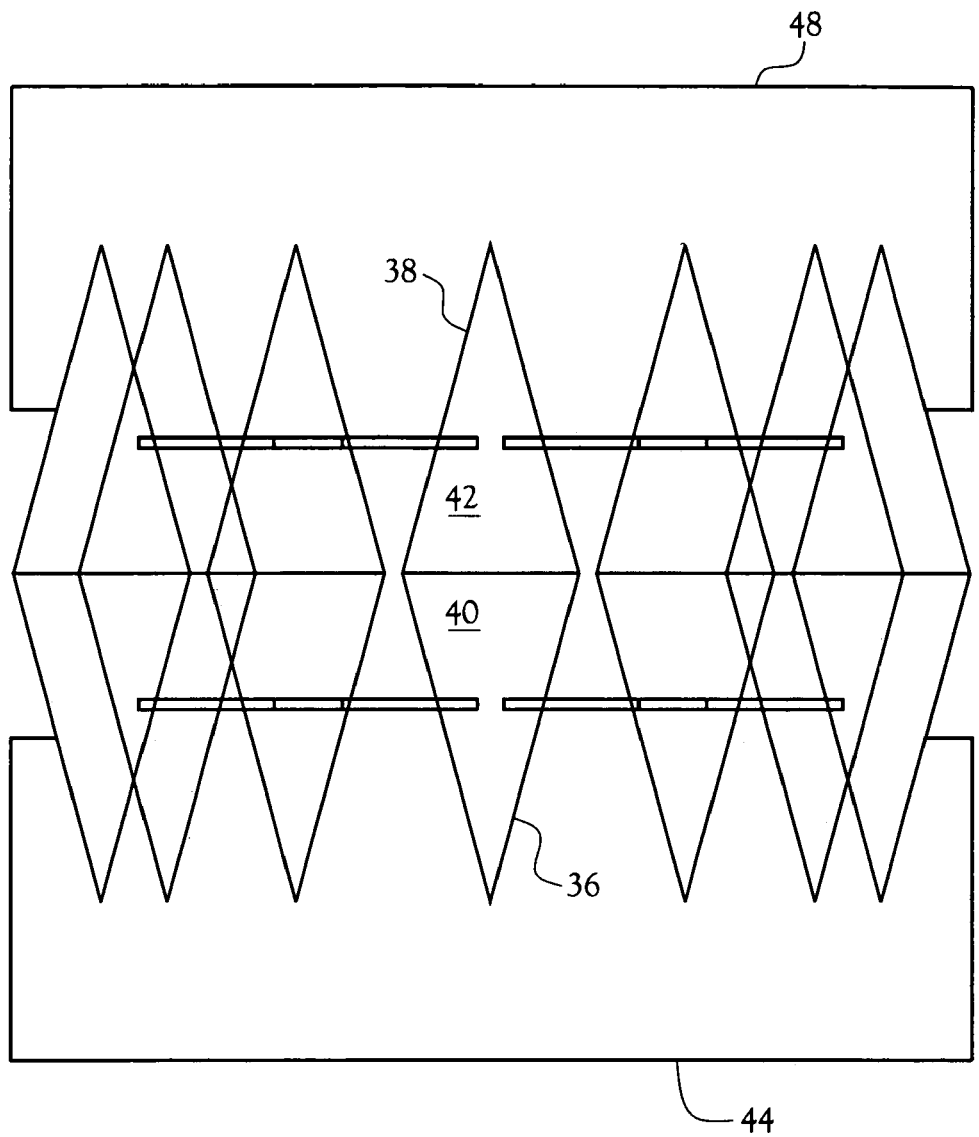
FIG. 3 is a schematic plan view of one embodiment of the present invention.

Referring to the drawings, in which like reference numbers refer to like parts, an apparatus for continuously variable transmission of energy from a drive cylinder to a driven cylinder is disclosed.

In the depicted embodiment, twelve transmitters and related followers are disclosed. The number of transmitters employed in a particular application will vary. Moreover, in the depicted embodiment the twelve transmitters are substantially identical. Accordingly, only one of the transmitters, along with the mechanism associated therewith will be described in detail. It will be understood that the remaining transmitters are constructed in substantially the same manner and operate in substantially the same manner.

Referring to FIG. 1, an elongated shifter 10 is coaxially mounted in a housing 11 on a rod 12. The shifter 10 comprises a first end portion 14, an opposed end portion 16 and a central portion 18 located between the first end portion 14 and the second end portion 16. The first end portion 14 is shaped as a frustum, having a narrow end connected to the central portion 18. Similarly, the second end portion 16 is shaped as a frustum, having a narrow end connected to the central portion 18. The central portion 18 is generally cylindrical in shape. It will be recognized that the central portion 18 may be a single piece or may be separated into two or more sections.

The shifter 10 is movable longitudinally along its axis, either along the rod 12 or with the rod 12.

A first elongated follower 20, including an inboard end 22 and an outboard end 24, extends radially from the first end portion 14 of the shifter 10 through the housing 11. The inboard end 22 of the follower 20 terminates in a contact surface 26 that engages the conical outer surface 28 of the first end portion 14. The outboard end 24 terminates in a rotatable wheel 30. The axis of rotation of the wheel 30 is parallel to the axis of the shifter 10.

Similarly, a second elongated follower 20a including an inboard end 22a and an outboard end 24a, extends radially from the second end portion 16 of the shifter 10 through the housing 11. The inboard end 22a of the follower 20a terminates in a contact surface 26a that engages the conical outer surface 29 of the second end portion 16. The outboard end 24a terminates in a rotatable wheel 30a. The axis of rotation of the wheel 30a is parallel to the axis of the shifter 10.

An elongated transmitter 34 is mounted adjacent to the wheels 30 and 30a. The transmitter 34 comprises a first end portion 36 and a second end portion 38. In the depicted embodiment, the first end portion 36 and the second end portion 38 both comprise cones having a common base. It will be recognized that the first end portion 36 and/or the second end portion 38 may be shaped as a frustum. The outer surface 40 of the first end portion 36 is rotatably engaged by the wheel 24. Similarly, the outer surface 42 of the second portion 38 is rotatably engaged by the wheel 24a.

Each of the followers 20 and 20a includes a biasing mechanism, such as springs 32 and 32a, respectively. The biasing mechanism ensures the continuous frictional engagement of the contact surfaces 26 and 26a with the outer surface 28 and 29, respectively, of the shifter 10 and continuous frictional engagement the wheels 30 and 30a with the outer surfaces 40 and 42 of the transmitter 34.

The outer surface 40 of the transmitter 34 is frictionally engaged with a driven cylinder 44. The outer surface 42 of the transmitter 34 is frictionally engaged with a drive cylinder 48.

In the depicted embodiment, fins 52 and 54 are mounted upon the cylinders 44 and 48, respectively. Rotation of the cylinders 44 and 48 carrying fins 52 and 54, respectively, effects a substantial air flow around the mechanism. Rotation of the drive cylinder 48 carrying fin 54 will draw air into the mechanism. Rotation of the driven cylinder 44 carrying fin 52 will exhaust air from the mechanism.

In operation, rotational energy is applied to the drive cylinder 48, as by an engine or motor, for example. Frictional engagement of the drive cylinder 48 with the outer surface 42 of the transmitter 34 effects rotation of the transmitter 34 around its axis. Frictional engagement of the outer surface 40 of the transmitter 34 with the driven cylinder 44 effects rotation of the cylinder 44.

The relative speeds of rotation of the driven cylinder 44 and the drive cylinder 48 are controlled by the particular engagement of the cylinder 44 and 48 with the outer surfaces 40 and 42, respectively. That is to say, if the cylinder 44 engages the first end portion 36 of the transmitter 34 at a location having a circumference that is equal to the circumference at the point of contact between the cylinder 48 and the second end portion 38 of the transmitter 34, then the speeds of the driven cylinder 44 and the drive cylinder 48 will be equivalent. However, if the cylinder 44 engages the first end portion 36 of the transmitter 34 at a location having a circumference that is less than the circumference at the point of contact between the cylinder 48 and the second end portion 38 of the transmitter 34 (as depicted in FIG. 1), then the rotational speed of the drive cylinder 48 will be greater than the rotational speed of the driven cylinder 44. Similarly, if the cylinder 44 engages the first end portion 36 of the transmitter 34 at a location having a circumference that is greater than the circumference at the point of contact between the cylinder 48 and the second end portion 38 of the transmitter 34 (the reverse of FIG. 1), then the rotational speed of the drive cylinder 48 will be less than the rotational speed of the driven cylinder 44.

Variation of the relative circumferences of the locations of engagement is accomplished by the shifter 10. As noted hereinbefore, the shifter 10 is mounted for longitudinal movement along its axis and the followers 20 and 20a are frictionally engaged with the first end portion 14 and the second end portion 16, respectively, and extend through the housing 11. The followers 20 and 20a are mounted for floating longitudinally movement.

Axial movement of the shifter 10 which increases the circumference of the location of engagement between the first end portion 14 and the inboard end 22 of the follower 20, urges the follower 20 radially outwardly. The outward radial movement of the follower 20 forces the transmitter to adjust the location of contact between the first end portion 36 and the wheel 30 to a location of reduced circumference. Simultaneously, the location of engagement between the end portion 16 and the inboard end 22a of the follower 20a is changed to a location of reduced circumference, thus allowing the follower 22a to move radially inwardly and allowing the wheel 30a to engage the second end portion of the transmitter 34 at a location of increased circumference.

The simultaneous opposing movement of the first follower 20 and the second follower 20a imparts a pivotal movement to the axis of rotation of the transmitter 34.

Although the depicted embodiment employs cone-shaped and frustum shaped surfaces, i.e. linear graduated surfaces, for the graduated surfaces, it will be recognized that a non-linear, graduated surfaces, such as a parabola may be employed without departing from the spirit and scope of the present invention.

Those skilled in the art will recognize that the disclosed continuously variable transmission is surprisingly simple in construction, yet provides continuously variable transmission of rotational energy from a drive cylinder to a driven cylinder.

Various modifications of structures and materials and can be used without departing from the spirit and scope of the present invention.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. An apparatus for providing continuously variable transmission of energy from a drive cylinder to a driven cylinder, said apparatus comprising:

a housing;

at least one double-conical transmitter having an axis of rotation, located adjacent to said housing and comprising a first conical surface having a base and a coaxial second conical surface having a base generally adjacent to said base of said first conical surface, said first conical surface frictionally engaging a drive cylinder and said second conical surface frictionally engaging a driven cylinder;

a shifter located within said housing and comprising a first conical surface and a coaxial second conical surface, said shifter being longitudinally movable;

a first elongated follower having a first end and a second end extending radially from said shifter and mounted within said housing for longitudinal movement, said first end of said first elongated follower frictionally engaging said first conical surface of said shifter and said second end of said first elongated follower rotatably engaging said first surface of said first conical surface of said transmitter;

a second elongated follower having a first end and a second end extending radially from said shifter and mounted within said housing for longitudinal movement, said first end of said second elongated follower frictionally engaging said second conical surface of said shifter and said second end of said second elongated follower rotatably engaging said second conical surface of said transmitter;

whereby axial movement of said shifter provides simultaneous and opposing movement of said first and second followers to impart pivotal movement of the axis of rotation of said transmitter.

2. The apparatus of claim 1 and further comprising a plurality of transmitters, each if said transmitters being provided with a first follower engaging said shifter and a second follower engaging said shifter.

3. The apparatus of claim 1 wherein said second end of said first follower includes a rotatable wheel for engagement with said first conical surface of said transmitter.

4. The apparatus of claim 1 wherein said first end of said first follower includes a contact surface for engagement with said first conical surface of said shifter.

5. The apparatus of claim 1 wherein said followers are urged into engagement with said transmitter and said shifter by springs.

6. The apparatus of claim 1 wherein at least one fin is provided on at least one of said cylinders to improve air flow for cooling.

7. An apparatus for providing continuously variable transmission of energy from a drive cylinder to a driven cylinder, said apparatus comprising:
   a housing;
   at least one double-conical transmitter comprising a first conical surface and a coaxial second conical surface and having an axis of rotation, located adjacent to said housing and comprising, said first conical surface frictionally engaging a drive cylinder and said second conical surface frictionally engaging a driven cylinder;
   a shifter located within said housing and comprising a first conical surface having a base and a coaxial second conical surface having a base generally adjacent to said base of said first conical surface, said shifter being longitudinally movable;
   a first elongated follower having a first end and a second end extending radially from said shifter and mounted within said housing for longitudinal movement, said first end of said first elongated follower frictionally engaging said first conical surface of said shifter and said second end of said first elongated follower rotatably engaging said first surface of said first conical surface of said transmitter;
   a second elongated follower having a first end and a second end extending radially from said shifter and mounted within said housing for longitudinal movement, said first end of said second elongated follower frictionally engaging said second conical surface of said shifter and said second end of said second elongated follower rotatably engaging said second conical surface of said transmitter;
   whereby axial movement of said shifter provides simultaneous and opposing movement of said first and second followers to impart pivotal movement of the axis of rotation of said transmitter.

8. The apparatus of claim 7 and further comprising a plurality of transmitters, each of said transmitters being provided with a first follower engaging said shifter and a second follower engaging said shifter.

9. The apparatus of claim 7 wherein said first end of said first follower includes a rotatable wheel for engagement with said first conical surface of said transmitter.

10. The apparatus of claim 7 wherein said second end of said first follower includes a contact surface for engagement with said first conical surface of said shifter.

11. The apparatus of claim 7 wherein said followers are urged into engagement with said transmitter by springs.

12. The apparatus of claim 7 wherein at least one fin is provided on at least one of said cylinders to improve air flow for cooling.

13. An apparatus for providing continuously variable transmission of energy from a drive cylinder to a driven cylinder, said apparatus comprising:
   a housing;
   at least one elongated transmitter having an axis of rotation, located adjacent to said housing and comprising a first graduated surface having a base and a coaxial second graduated surface having a base generally adjacent to said base of said first graduated surface, said first graduated surface frictionally engaging a drive cylinder and said second graduated surface frictionally engaging a driven cylinder;
   a shifter located within said housing and comprising a first graduated surface and a coaxial second graduated surface, said shifter being longitudinally movable;
   a first elongated follower having a first end and a second end extending radially from said shifter and mounted within said housing for longitudinal movement, said first end of said first elongated follower frictionally engaging said first graduated surface of said shifter and said second end of said first elongated follower rotatably engaging said first surface of said first graduated surface of said transmitter;
   a second elongated follower having a first end and a second end extending radially from said shifter and mounted within said housing for longitudinal movement, said first end of said second elongated follower frictionally engaging said second graduated surface of said shifter and said second end of said second elongated follower rotatably engaging said second graduated surface of said transmitter;
   whereby axial movement of said shifter provides simultaneous and opposing movement of said first and second followers to impart pivotal movement of the axis of rotation of said transmitter.

14. The apparatus of claim 13 and further comprising a plurality of transmitters, each if said transmitters being provided with a first follower engaging said shifter and a second follower engaging said shifter.

15. The apparatus of claim 13 wherein said second end of said first follower includes a rotatable wheel for engagement with said first graduated surface of said transmitter.

16. The apparatus of claim 13 wherein said first end of said first follower includes a contact surface for engagement with said first graduated surface of said shifter.

17. The apparatus of claim 13 wherein said followers are urged into engagement with said transmitter and said shifter by springs.

18. The apparatus so claim 13 wherein at least one fin is provided on at least one of said cylinders to improve air flow for cooling.

* * * * *